United States Patent Office 2,802,980
Patented Aug. 13, 1957

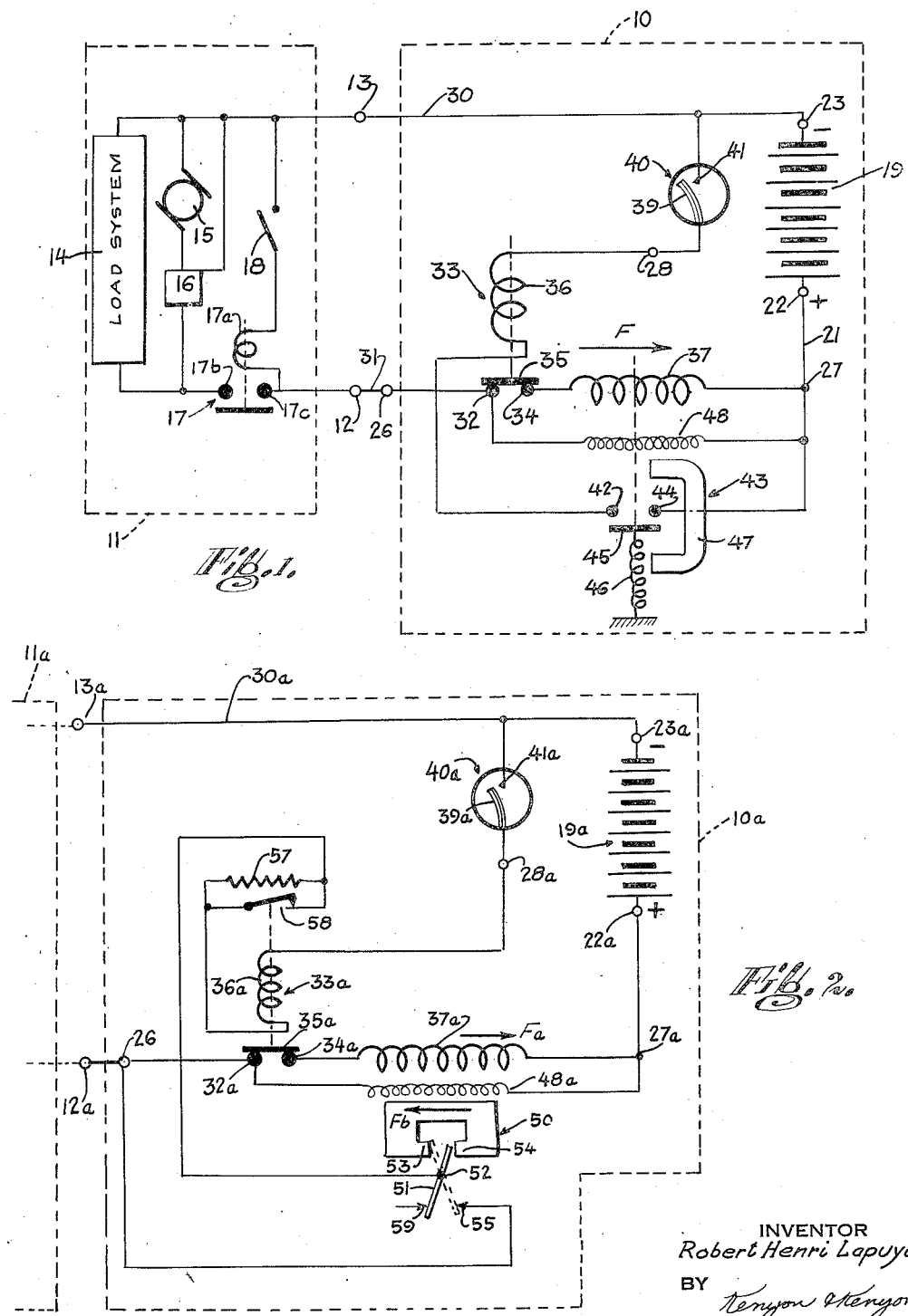

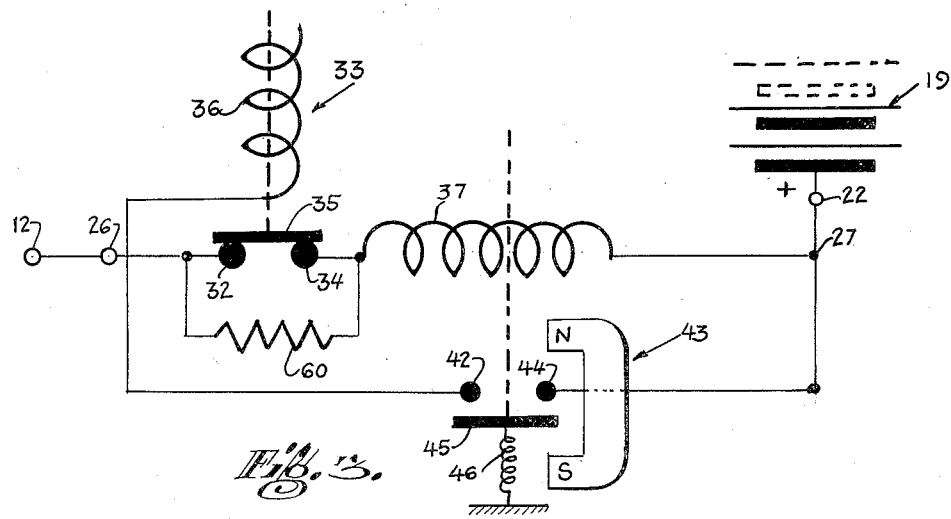
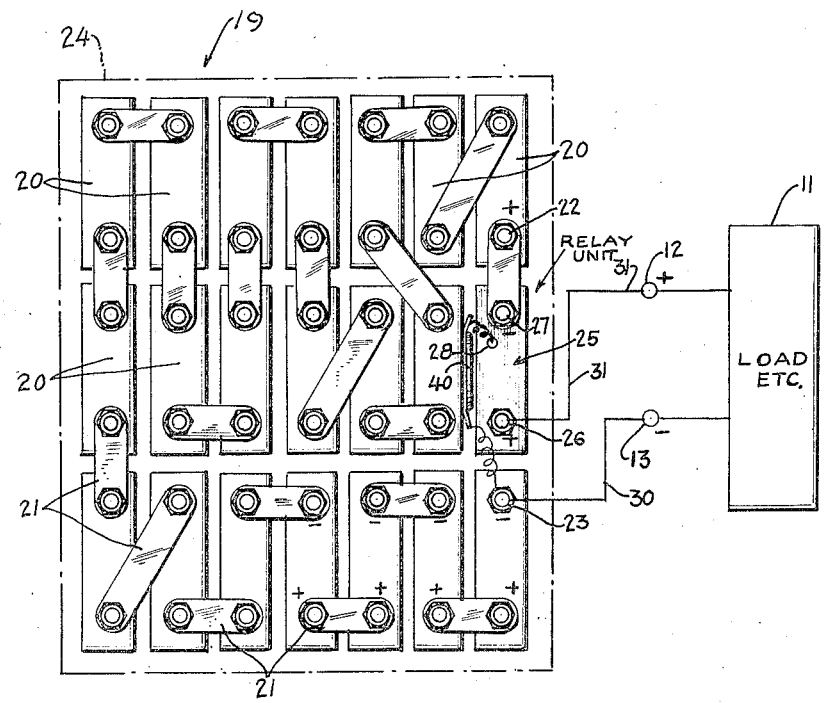

2,802,980

PROTECTIVE ARRANGEMENT FOR SEALED OR GAS-TIGHT BATTERIES

Robert Henri Lapuyade, Paris, France, assignor to Societe des Accumulateurs Fixes et de Traction (Societe Anonyme), Romainville, France, a corporation of France Application March 20, 1956, Serial No. 572,770

Claims priority, application France March 25, 1955

7 Claims. (Cl. 320—36)

This invention relates to protective arrangements for sealed or gas-tight batteries intended to prevent overheating and vaporization of the electrolyte caused by battery overcharging.

With batteries of the type mentioned which are, for example, those described in United States Patent No. 2,646,455 to Jeannin, when they are fully charged, any additional energy supplied to them by an overcharging current can only be dissipated as heat. The rise of temperature which then results must be controlled and limited to prevent overheating and vaporization of the electrolyte. Such vaporization, because the battery is sealed or gas-tight, is likely to prove dangerous because internal pressure may rise enough to cause an explosion of the sealed cells.

In electrical load systems that utilize a generator and also a sealed battery of the type mentioned as a buffer battery a requisite is that the average output of the generator shall be superior to the average output of the electrical system so that it is always possible to secure proper distribution and supply of the required electrical energy for the system. In meeting this requirement, the buffer battery is unavoidably in a state of overcharge at certain times.

Several earlier protective devices using thermostatic interrupters in thermal contact with the battery and operatively responsive to battery temperatures have already been designed to provide protection for the batteries in cases of overcharge. However, these earlier known devices have not always been satisfactory. Moreover, all have had the disadvantage of complicating excessively the required electrical connections between the battery and the other components of the electrical system.

Principal objects and features of the present invention are the provision of a device comprising a combination of a gas-tight or sealed battery and a protective unit incorporated directly therein and which arrangement has only the two usual external connection terminals so that the device may be connected to a generator load system without difficulty as a replacement for an ordinary unprotected gas-tight battery.

Other objects and features of the invention are the provision of novel electrical interconnections between the components of the said unit to provide for effective protective action for the battery against excessive overcharge during its use in the electric circuit.

Additional objects and features of the invention include the provision of automatic means in the protective arrangement to permit current discharge from even an overheated buffer battery when a high current is required by the load in the electrical system.

Other objects and features of the invention will become apparent from the following specification and the accompanying drawings wherein:

Fig. 1 is a schematic circuit diagram of an arrangement including the protective unit of this invention;

Fig. 2 is a schematic showing of a modified arrangement that may be utilized in place of the arrangement of Fig. 1;

Fig. 3 is a similar schematic showing of a further modification of the arrangement of Fig. 1; and Fig. 4 illustrates diagrammatically in plan view a combined battery of individual cells and includes the protective unit of this invention as arranged in a battery housing.

In accordance with the invention the battery protective unit is adapted to be incorporated within the battery housing which contains the individual cells that are interconnected as usual to provide the desired output voltage. The unit itself is enclosed in a protective casing having the same dimensions as the casings of the individual cells of the battery and is mounted in the battery housing. This unit includes a circuit closing relay whose operating coil is connected serially through a thermostatic switch to one of the output terminals or conductors of the battery. The bridging or circuit closing member for the switch contacts of the relay is normally in a circuit closing position when the relay operating coil is not energized. The operating coil of said closing relay is series-connected both to a bimetallic thermostatic switch which is thermally responsive to temperatures within the battery and which is closed when heated above determined temperatures and to appropriate contacts of a polarized relay whose contacts are designed to be closed by its circuit closing member when the polarized relay is energized by current flow in a prescribed direction. The polarized relay includes a low resistance (ammetric) winding that is series connected to the other conductor of the battery and to one of the contacts of the circuit closing relay. In addition, means are provided to maintain the contacts of the polarized relay in circuit closed condition once such condition has been effected as long as current tends to flow to the battery from the generator in the load circuit for which the battery acts as a buffer. The last named means may, for example, be electrical in nature and comprise a high resistance (voltmetric) winding constituting a part of the polarized relay and connected to shunt the two contacts of the circuit closing relay. In a further embodiment this means may be provided by magnetic locking means. In the latter event a high resistance (voltmetric) winding is utilized, as will be described, to unlock the said means, as required. In a still further embodiment this means may be provided by a shunt resistor, as will be described.

Referring to the drawings and first to Fig. 1, the combined battery and protective unit are included in the dotted line rectangle 10. Similarly the electrical generator-load circuit which is to be served as a buffer by the protected battery of the type in question is included within the dotted line rectangle 11. The components within the two rectangles are adapted to be connected together simply at the two connection terminals 12 and 13. The circuit components within the rectangle 11 which comprise the electric generator-load circuit include a load system 14, a generator 15 with its conventional make-and-break circuit element 16. In addition, an electro-magnetic circuit closing switch or relay 17 whose operating coil 17a is serially connected with a manual switch 18 across the terminals 12 and 13 serves when the normally open switch 18 is closed to energize the coil 17a of relay 17 and establish a circuit closing condition at the relay contacts 17b and 17c and thus permit current flow from the battery within rectangle 10 to the load containing circuit 11 via the connection terminals 12 and 13 or vice-versa.

The components within the unit rectangle 10 include the gas-tight or sealed battery 19 which is adapted to be used as a buffer battery for the load system 14 in relationship to the generator 15. This battery 19, as seen in Fig. 4, for example, includes a group of individual cells 20 each in a sealed separate overall casing and each constructed in accord with the disclosure of the aforementioned patent to Jeannin. The positive and negative terminals of the various cells 20 are interconnected in conventional manner by strap connectors 21 to provide desired battery output voltage at the positive and negative terminals 22 and 23 of the battery as a whole. The cells 20 all are suppored in a common battery housing 24 in any desirable way.

The protective unit designated generally by the reference character 25 in Fig. 4, includes the other components of rectangle 10 of Fig. 1 except the battery 19 and a thermostatic switch to be presently described all housed in a sealed casing of similar dimensions to those of the cells 20. This protective unit 25 is also positioned within the battery housing 24 so that its contents have substantially the same environment as that of the cells 20 within the housing 24. This device 25 is provided with external terminals 26, 27 and 28 which are connected to components located internally of the casing of said unit 25, as will be described. The terminals 26, 27 and 28 facilitate simple and quick connection of the protective device in proper functioning manner to battery 19 and the other parts as will be described.

One of the battery terminals in this embodiment, its negative terminal 23, is connected directly by cable 30 to the connection junction 13. The other connection junction 12 is connected by a cable 31 to the external terminal connector 26 of the device 25. Internally of device 25, its terminal connector 26 is connected to one of the contacts 32 of a circuit closing relay 33. This relay 33 has a second contact 34 spaced from contact 32 and a circuit bridging armature or interlock 35 which normally bridges the gap between contacts 32 and 34 when coil 36 of relay 33 is not energized. The second contact 34 of relay 33 is connected to one lead of a low resistance (ammetric) coil 37 whose other lead is connected to the unit terminal 27. The latter is connected by a strap 21 to the positive battery terminal 22. The circuit closing relay 33 is housed in the casing of the unit 25. The armature or interlock 35 is in circuit closing condition across contacts 32 and 34 while coil 36 of circuit closing relay 33 is not energized. The energizing coil 36 of the circuit closing relay 33 has one of its leads connected to the external terminal 28 of the unit 25. This external terminal 28 is connected to one contact 39 of a normally open thermostatic switch or interrupter 40 (that closes when heated above a determined temperature) and whose other contact 41 is connected to the negative terminal 23 of the battery 19.

The other lead of relay operating coil 36 is connected to a contact 42 of a polarized relay 43 of which the ammetric coil 37 is one control winding. The second contact 44 of said polarized relay is connected to terminal 27 of unit 25 and hence to the positive battery terminal 22. The circuit closing armature or interlock 45 for contacts 42 and 44 of the polarized relay 43 is normally biased to an open circuit condition as by a spring 46. The polarized relay 43 is of conventional type and includes the permanent magnet 47 disposed in such a way with respect to its spring biased circuit closing armature or interlock member 45 that said member 45 only bridges contacts 42 and 44 and closes the circuit through them when electric current flows through the ammetric relay coil 37 in a fixed direction, e. g., in the direction of arrow F. The direction of polarization selected is such that the circuit closing condition of polarized relay 43 occurs when current flows from the generator 15 toward battery in the direction of said arrow F.

A second (high resistance) coil or voltmetric winding 48 for the polarized relay 43 wound in the same direction as its low resistance ammetric coil 37 is connected between contact 32 of said relay 43 and the same battery terminal 22 to which its ammetric coil 37 is connected, thus providing a shunt path around contact 34 of relay 43 for purposes presently to be described.

The thermostatic switch 40 is supported conveniently by means (not shown) externally of unit 25 but so as to lie in contact with one of the cells 21 of the battery internally of battery housing 24 (as seen in Fig. 4) thus being sensitive to cell temperatures within the battery 19.

OPERATION (FIG. 1)

Operation of the arrangement just described is as follows: The battery and protective unit within rectangle 10 are simply connected to the circuit 11 by attaching the cables 30 and 31 to the connection terminals 13 and 12. Assuming that battery 19 is cool, the thermostatic switch 40 is open and coil 36 is not energized. The circuit through contacts 32 and 34 of relay 33 then is closed by the interlock 35. Battery 19 is thus then connected to deliver power to circuit 11 under normal operating conditions with respect to the circuit 11 with current therefrom flowing through relay coils 37 and 48 reversely to the direction of arrow F so that battery 19 then functions as a conventional buffer battery discharging and being capable of being charged by current from generator 15 in conventional manner.

If, however, the battery 19 becomes completely charged during such use, it commences to receive an overcharge from generator 15 and its temperature rises. When a predetermined selected temperature occurs within the battery, the thermostatic switch 40 which is in physical contact with a cell 20 of the battery 19 closes thus readying the circuit affecting relay coil 36 for energization. Two alternative situations may occur on closure of thermostatic switch 40.

(1) If at occurrence of this event the battery 19 is supplying current to the circuit in rectangle 11, current is flowing through ammetric coil 37 of polarized relay 43 reversely to the direction of arrow F. In consequence, the armature or interlock member 45 of relay 43 does not move and the circuit through relay contacts 42 and 44 remains open. The result is that current supply from battery 19 to the circuit in rectangle 11 will continue, and tend to cool off the battery.

(2) In the alternative, if at the moment of closure of thermostatic switch 40, the generator 15 is supplying a charging current to the battery 19, then current flow in ammetric polarized relay coil 37 is in the direction of arrow F. As a result, the circuit closing armature or interlock 45 is moved in opposition to its biasing spring 46 into circuit closing position, bridging contacts 42 and 44. Relay coil 36 is then energized moving its armature or interlock 35 away from and breaking the circuit at its contacts 32 and 34 thus immediately interrupting charging of the battery 19 because of the gap then occurring between contacts 32 and 34. Although the flow of charging current to the battery 19 is thus interrupted, a smaller current can still flow from generator 15 in the direction of the arrow F through the voltmetric relay coil 48 thus holding the armature or interlock 45 of the polarized relay 43 in its circuit closing condition relative to contacts 42 and 43. The high resistance of voltmetric coil 48, however, precludes delivery of any substantial charging current to the battery 19.

Thus, while this situation persists the relay coil 36 remains energized as long as both the thermostatic switch 40 remains closed and the contacts 42 and 44 remain bridged. If during this condition a high supply of current should be required from the battery by the load 14, the voltage at contact 32 will fall to a lower value. The difference between the voltage at 22 and that at 32 will decrease and the current flowing through 48 will decrease too and become too low to maintain the interlock 45 of the polarized relay 43 in its circuit closing position. The said interlock 45 will then be drawn out of circuit closing position relative to contacts 42 and 44 by the action of its spring 46. As a result, relay coil 36 will become deenergized and its circuit closing armature or interlock 35 will again bridge the contacts 32 and 34 and again permit the battery 19 to supply current counter to the direction of arrow F through ammetric coil 37 to the load 14 in the electric circuit within rectangle 11.

Modification of Fig. 2

At some critical values of the voltage at 32 (values very slightly higher than the value of the voltage at 22), and due to the slight oscillations unavoidably existing in the voltage of a generator, the circuit closing armature or interlock member 45 of polarized relay 43 may vibrate alternately between circuit open and circuit closing positions. Such unstable condition is undesirable. In order to eliminate this difficulty, the polarized relay 50 of Fig. 2 may be substituted for the polarized relay 43 of Fig. 1. In polarized relay 50, the circuit closing armature or interlock member 51 is a permanent magnet which is pivotally supported at 52 so that one of its permanently magnetized poles in this instance, for example, its south magnetic pole lies in the air gap between the (normally non-magnetized) pole tips 53 and 54 of the core of the polarized relay 50 and is swingable between these pole tips on the pivot 52.

The magnetic circuit closing armature or interlock member 51 is thus provided with two positions of rest and of stable equilibrium. The magnetic attraction of its permanent pole end in the air gap between pole tips 53 and 54 is such that said end is held against the nearest of these pole tips by magnetic attraction as long as that tip is either demagnetized or has a polarity opposite to that of the end of said magnetic interlock member or armature 51 in said air gap. As shown in full line in Fig. 2, said end is attracted toward pole tip 54 which is then either demagnetized or has north polarity. At this time, a fixed contact 55 of polarized relay 50 is separated from the interlock 51 for purposes presently to be described.

The ammetric relay coil 37a and voltmetric coil 48a of the relay 50 correspond with respective coils 37 and 48 of the polarized relay 43 and are connected in the same way to the positive battery terminal 22a and to contacts 32a and 34a of the circuit closing relay 33a which is similar to relay 33. The armature or circuit closing interlock 35a of relay 33a is movable away from circuit closing engagement with contacts 32a and 34a when relay coil 36a is energized. One lead of coil 36a is connected to terminal 28a and thence through thermostatic switch 40a to negative terminal 23a of battery 19a. The other lead of coil 36a is connected through a series resistor 57 to the armature or interlock 51 of polarized relay 50. Resistor 57 is shunted by a normally closed switch 58 which is opened by movement of relay interlock 35a automatically when relay coil 36a is energized.

OPERATION (Fig. 2)

With this arrangement, when current flows in the direction $F_a$ through coil 37a (a charging current from the generator), a north pole appears on pole end 53. This attracts the end of magnetic interlock 51 in the air gap and rotates the interlock 51 about pivot 52 so that its other end moves away from stop 59 into circuit closing engagement with contact 55. If at this moment the battery is cold, thermostatic switch 40a remains open and flow of charging current to the battery 19a continues. If the battery is hot enough so that thermostatic switch 40a is closed however, relay coil 36a becomes energized moving its interlock 35a out of circuit closing position with its relay contacts 32a and 34a and charging of the battery then stops. At the same time, switch 58 is opened by the movement of interlock 35a. If charging current is still coming from the generator, sufficient current still flows in the voltmetric coil 48a in direction of the arrow $F_a$ so that the closed circuit between interlock 51 and contact 55 is maintained. Thus, the relay coil 36a remains in an energized state which is sufficient to keep interlock 35a away from contacts 32a and 34a, although the current flow through coil 36a is reduced by the resistor 57 which has been put into action by the opening of switch 58. Moreover, if charging current from the generator ceases to flow, the magnetic attraction between the end of interlock 51 in the air gap and the then demagnetized pole tip 53 will keep the circuit closed at contact 55 and in such condition as long as a north pole does not appear on pole tip 54. Thus, there is a magnetic lock of the interlock 51 in relation to contact 55 which prevents charging of the battery as long as pole tip 54 does not become north.

Pole tip 54 can become north when the voltage at contact 32a falls below that at battery terminal 22a on the occurrence of a high current demand by the load. When such voltage conditions occur, current flows through voltmetric coil 48a from battery 19 in direction of arrow $F_b$ which is in reverse direction to that of arrow $F_a$ causing a north pole to appear at pole tip 54. This attracts the end of interlock armature 51 in the air gap between the pole tips to it breaking the circuit between interlock 51 and the contact 55. This causes deenergization of circuit closing relay coil 36a and also circuit closing movement of its interlock or armature 35a to bridge contacts 32a and 34a and thus allow current to flow reversely to arrow $F_a$ from the battery via ammetric coil 37a and contacts 34a and 32a to the load even though the battery 19 is hot enough for thermostatic switch 40 to remain closed. The polarized interlock 51 then remains in its second position of stability or equilibrium, i. e., in its full line position attracted to pole tip 54, even though the latter should become demagnetized and as long as a north pole does not again reappear on pole tip 53. In the latter event, battery charging circuit conditions are restored.

In the polarized relay 43 of Fig. 1 the function of the voltmetric coil 48 is to maintain the circuit closing armature or interlock member 45 in a circuit closing condition once this condition has been established by appropriate directional current flow of current in its ammetric coil 37. In the case of polarized relay 50 of Fig. 2 on the other hand, the chief action of the voltmetric coil 48 is to effect a movement of the pivoted magnetic armature or interlock member 51 from one of its described magnetically locked positions of stability or equilibrium in engagement with one pole end 53 or 54 as the case may be to the other. It is to be understood that the relays 33a and 50 are mounted in a sealed casing located within the battery housing in the same way as relays 33 and 43 and that the thermostatic switch 40a is positioned similarly to thermostatic switch 40.

Modification of Fig. 3

The arrangement of Fig. 1 may be further simplified to eliminate the voltmetric coil 48 by the substitution therefore of a resistor 60 (Fig. 3) directly shunting the contacts 32 and 34 of relay 33. All other circuit connections are identical with those of Fig. 1. The current strength needed to maintain the circuit closed condition of armature or interlock 45 relative to its contacts 42 and 44 is much lower than the current required initially to effect such condition. Hence, after the armature or interlock 45 of polarized relay 43 has been moved to its circuit closing condition by initial full charging current flow through its ammetric coil 37 as hereinbefore described, the smaller current flowing through the latter via shunt resistor 60 after breaking of the circuit between contacts 32 and 34 by movement away therefrom of armature or interlock 35 of relay 33 is sufficient to maintain the polarized relay armature or interlock 45 in its circuit closing condition.

It is to be noted that in all embodiments described a low overcharging current can always flow to the battery either via the high voltmetric coils 48 or 48a or the shunt resistor 60. The electrical resistance values of these parts, however, are sufficiently high to limit this small current to a value that can be safely borne by gas-tight batteries under all circumstances.

An advantage of the arrangement of Fig. 2 over that of Fig. 1, also occurs if the circuit of rectangle 11 is disconnected from terminals 12a and 13a at a time when thermostat 40a is closed. When this occurs, relay coil 33a which is being energized by current flow through contact 55 and interlock 51, caused by current flow through coil 48a in a direction opposite to the arrow $F_b$ is deenergized immediately because a current flow in direction of arrow $F_b$ is established in coil 48a which swings magnetized armature away from contact 55 and then breaks the circuit through relay coil 36a. In contrast the same occurrence in Fig. 1 will result in wasted battery current flow through relay coil 36 as long as thermostatic switch 40 remains closed.

While specific embodiments of the invention have been described, variations within the scope of the claims are possible and are contemplated. There is no intention therefore of limitation to the exact details shown and described.

What is claimed is:

1. A protective device for a gas-tight battery comprising a circuit closing relay having an operating coil and circuit closing contacts normally in circuit-closed condition when said coil is not energized, a thermostatic switch which is normally open below a determined temperature, a polarized relay including an ammetric coil and circuit closing contacts, the latter being normally in circuit open condition, said last-named contacts, said thermostatic switch and said first-named coil being serially connected to receive power from said battery, and said first-named contacts and said ammetric coil being serially connected to a terminal of said battery whose other terminal is connected to an external source of charging current, and means for maintaining circuit-closed condition of said polarized relay contacts when charging current tends to flow to the battery from said external source, said thermostatic switch closing however when the temperature of the battery exceeds said determined temperature to permit energization of first-named coil and an opening of the circuit closed condition of said first-named contacts to thereby interrupt flow of charging current to said battery from said source.

2. A protective arrangement for use with a gas-tight battery employed as a buffer battery with a generator for a load system to prevent dangerous temperature rises in said battery due to charging current flow thereto comprising circuit closing relay means, polarized relay means and thermostatic switching means, said polarized relay means including an ammetric coil connected in series with contacts of said circuit closing relay means and one terminal of the battery, said circuit-closing relay means including an operating coil connected in series with the other terminal of said battery, with the thermostatic switch means and with contacts of said polarized relay, said contacts of said circuit-closing relay being in circuit-closed condition when said operating coil is not energized, said contacts of said polarized relay being normally in circuit-open condition, circuit-closed condition thereat being established by flow of charging current from said generator to said battery through said ammetric coil, the series connection of said polarized relay contacts, said operating coil and said thermostatic switch requiring closed condition both of said polarized relay contacts and of said thermostatic switching means to energize said relay operating coil and thereby open the normally closed circuit condition of the contacts of said circuit closing relay, and means for maintaining closed circuit condition at said polarized relay contacts despite the establishment of open circuit condition at said circuit closing relay contacts.

3. The device of claim 2 in which said last-named means includes a voltmetric coil.

4. The device of claim 2 in which said last-named means includes a resistor in shunt connection with the circuit closing relay contacts.

5. The device of claim 2 in which said polarized relay includes a movable magnetic contact member having two positions of rest and stable equilibrium, and a voltmetric coil for effecting a shift of said contact member from one of its said two positions to the other.

6. The device of claim 2 in which said polarized relay includes a core provided with an air gap separating its poles, a magnetized armature having two positions of rest and equilibrium in said air gap relative to said poles, said ammetric coil being wound on said core and a voltmetric coil similarly wound on said core, said coils being connected to said battery so that a flow of charging current through both will move said armature to one of its said two positions, and a reverse flow of current through the voltmetric coil will cause a shift of said armature to the other of its two said positions.

7. A protective device for a gas tight battery comprising a circuit closing relay having an operating coil and circuit closing contacts normally in circuit-closed condition when said coil is not energized, a thermostatic switch which is normally open below a determined temperature, a polarized relay including an ammetric coil and circuit closing contacts, the latter being normally in circuit open condition, said last-named contacts, said thermostatic switch and said first-named coil being serially connected to receive power, and said first-named contacts and said ammetric coil being serially connected to a terminal of said battery whose other terminal is connected to a load and an external source of charging current, and means for maintaining circuit closed condition of said polarized relay contacts when charging current tends to flow to the battery from said external source, said thermostatic switch closing, however, when the temperature of the battery exceeds said determined temperature to permit energization of said first-named coil and an opening of circuit closed condition of said first-named contacts to thereby interrupt flow of charging current to said battery from said source, and shunting means for maintaining closed circuit conditions at said polarized relay contacts despite establishment of open circuit condition at said circuit closing relay contacts until occurrence of a high current demand from the battery by the load which causes the polarized relay contacts to return to open circuit condition resulting then in deenergization of the said operating coil and reclosing of the first-named circuit closing contact so as to permit the battery to then supply current to meet the load demand irrespective of the temperature of the battery.

References Cited in the file of this patent

UNITED STATES PATENTS

| 976,747 | Schmidt | Nov. 22, 1910 |
| 2,139,330 | Gilson | Dec. 6, 1938 |
| 2,431,945 | Little et al. | Dec. 2, 1947 |
| 2,498,814 | Little et al. | Feb. 28, 1950 |
| 2,499,663 | Medlar | Mar. 7, 1950 |
| 2,645,455 | Jeannin | July 21, 1953 |